US011298787B2

(12) United States Patent
Chen et al.

(10) Patent No.: US 11,298,787 B2
(45) Date of Patent: Apr. 12, 2022

(54) ADJUSTABLE WORKPIECE SUPPORT SYSTEM AND METHOD

(71) Applicant: Industrial Technology Research Institute, Hsin-Chu (TW)

(72) Inventors: Chun-Ting Chen, Taichung (TW); Chien-Chih Liao, Taichung (TW); Pei-Yin Chen, Taichung (TW); Bo-Jyun Jhang, Taichung (TW); Jen-Ji Wang, Taichung (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 177 days.

(21) Appl. No.: 16/805,133

(22) Filed: Feb. 28, 2020

(65) Prior Publication Data
US 2021/0154781 A1 May 27, 2021

(30) Foreign Application Priority Data
Nov. 26, 2019 (TW) ................................. 108142897

(51) Int. Cl.
*B23Q 1/03* (2006.01)
*B23Q 3/10* (2006.01)
(Continued)

(52) U.S. Cl.
CPC ........... *B23Q 1/035* (2013.01); *B23Q 1/0009* (2013.01); *B23Q 3/106* (2013.01); *B23Q 15/00* (2013.01); *B25B 11/00* (2013.01)

(58) Field of Classification Search
CPC ......... B23Q 1/035; B23Q 1/037; B25B 11/00; B25B 11/02; Y10T 29/49805; B64F 5/10; B64F 5/40; B64F 5/50; B64F 5/60
See application file for complete search history.

(56) References Cited

U.S. PATENT DOCUMENTS 5,364,083 A 11/1994 Ross et al.
8,944,423 B2 2/2015 Marrinan et al.
(Continued)

FOREIGN PATENT DOCUMENTS

CN 207087702 U 3/2018
CN 109848724 6/2019
(Continued)

OTHER PUBLICATIONS

A. Gameros, S. Lowth, D. Axinte, A. Nagy-Sochacki, O. Craig, H.R. Siller, State-of-the-art in fixture systems for the manufacture and assembly of rigid components: A review,International Journal of Machine Tools and Manufacture,vol. 123,2017, pp. 1-21,ISSN 0890-6955.
(Continued)

*Primary Examiner* — Tyrone V Hall, Jr.
(74) *Attorney, Agent, or Firm* — WPAT, PC (57) ABSTRACT

An adjustable workpiece support system includes an adjustable support apparatus, an analysis support point module, a coordinate post-processing module and a control module. The adjustable support apparatus has a group of support devices for supporting a supported workpiece, the each support device being adjustable in height and angle. The analysis support point module is used to import a computer-aided design file of the supported workpiece, and analyze the computer-aided design file to obtain a group of support points of the supported workpiece. The coordinate post-processing module is configured to calculate the support coordinates of the each support device corresponding to the group of support points. The control module is configured to receive the support coordinates of the each support device, and adjust the height and angle of the each support device to support the supported workpiece, so that the amount of deformation of the supported workpiece is the minimum.

4 Claims, 6 Drawing Sheets

(51) Int. Cl.
 *B23Q 1/00* (2006.01)
 *B25B 11/00* (2006.01)
 *B23Q 15/00* (2006.01)

(56) References Cited

U.S. PATENT DOCUMENTS

| | | | |
|---|---|---|---|
| 10,179,376 B2 | 1/2019 | Deiss | |
| 2007/0020065 A1 | 1/2007 | Kirby | |
| 2009/0126187 A1 | 5/2009 | Kajiyama et al. | |
| 2011/0190941 A1* | 8/2011 | Marsh | B64F 5/60 700/275 |
| 2016/0039196 A1 | 2/2016 | Harris et al. | |

FOREIGN PATENT DOCUMENTS

| | | |
|---|---|---|
| DE | 102013112292 B4 | 5/2016 |
| TW | 201507054 | 2/2015 |
| TW | I587968 | 6/2017 |
| TW | 201834783 | 10/2018 |
| TW | 201918686 | 5/2019 |

OTHER PUBLICATIONS

Hui Li, Weifang Chen, Shengjie Shi, Design and Application of Flexible Fixture, Procedia CIRP, vol. 56, 2016, pp. 528-532, ISSN 2212-8271.
Otto J. Bakker, Thomas N. Papastathis, Svetan M. Ratchev and Atanas A. Popov,Recent Research on Flexible Fixtures for Manufacturing Processes,Recent Patents on Mechanical Engineering, vol. 6, Issue 2, pp. 107-121, year 2013, ISSN 2212-7976/1874-477X.
TW OA issued on Jun. 30, 2020.

\* cited by examiner

FIG. 6

ADJUSTABLE WORKPIECE SUPPORT SYSTEM AND METHOD

CROSS REFERENCE TO RELATED APPLICATION

The application is based on, and claims priority from, Taiwan Application Serial Number 108142897, filed on Nov. 26, 2019, the disclosure of which is hereby incorporated by reference herein in its entirety.

TECHNICAL FIELD

The present invention relates to a workpiece support system, and more particularly to an adjustable workpiece support system and method for curved workpieces.

BACKGROUND

Generally, for the positioning of large curved workpieces, manual positioning is often used. The support system used must fit the curved surface of the workpiece. However, due to the huge number of support points, each point must be aligned, and manual adjustment of the angle of the support system requires a long operation time, and low positioning accuracy. In addition, the same support points are usually used to support various workpieces, resulting in a large amount of deformation for each workpiece. When supporting workpieces of different materials or different contours, due to different materials, shapes and weak positions, if a workpiece is supported using the same support points, it will cause a large amount of deformation of the workpiece during the support process.

Glass fiber reinforced plastic composites are widely used in the fields of automobiles, aerospace and ships due to their light weight and high strength. In the past, most of the composite material parts were fixed by fixed fixtures to assist in the machining process. In a small amount and diverse market, in addition to make special fixtures based on workpieces, the process of installing and removing fixtures is cumbersome, and it takes a huge space to save fixtures. Especially in the machining of large parts such as ships and aerospace, the number of fixtures is quite huge, resulting in high processing costs and insufficient production lines. As a result, adjustable clamping jigs have gradually begun to be applied. However, due to a small number of diverse and large workpieces, the number of supporting points using the adjustable clamping jigs is huge. If manual adjustment is used, a longer setting time is required and positioning accuracy is low. Therefore, there is a need for a support system and method that is fast in operation and suitable for a small number of diverse and large workpieces and has high positioning accuracy.

SUMMARY

The disclosure is to provide an adjustable workpiece support system and method. The support system has fast operation speed, is suitable for a small number of large and diverse workpieces, and has high positioning accuracy.

The disclosure provides an adjustable workpiece support system including an adjustable support apparatus, an analysis support point module, a coordinate post-processing module and a control module. The adjustable support apparatus has a group of support devices for supporting a supported workpiece, the each support device being adjustable in height and angle. The analysis support point module is used to import a computer-aided design file of the supported workpiece, and is used to analyze the computer-aided design file to obtain a group of support points of the supported workpiece. The coordinate post-processing module is configured to calculate the support coordinates of the each support device corresponding to the group of support points. The control module is configured to receive the support coordinates of the each support device, and is configured to adjust the height and angle of the each support device to support the supported workpiece, so that the amount of deformation of the supported workpiece is the minimum.

The disclosure further provides an adjustable workpiece support method including following steps. First, an adjustable support apparatus is provided. The adjustable support apparatus has a group of support devices for supporting a supported workpiece, and the each support device is adjustable in height and angle. Second, a computer-aided design file of the supported workpiece is imported, and the computer-aided design file is analyzed to obtain a group support points of the supported workpiece. Next, support coordinates of the each support device corresponding to the group of support points are calculated. Finally, the height and angle of the each support device are adjusted to support the supported workpiece based on the support coordinates of the each support device, so that the amount of deformation of the supported workpiece is the minimum.

DETAILED DESCRIPTION

The disclosed embodiments produce an adjustable workpiece support system. The adjustable workpiece support system can calculate the amount of deformation of all support points when the supported workpiece is supported, so that the amount of deformation of the supported workpiece is the minimum.

Figure 1:
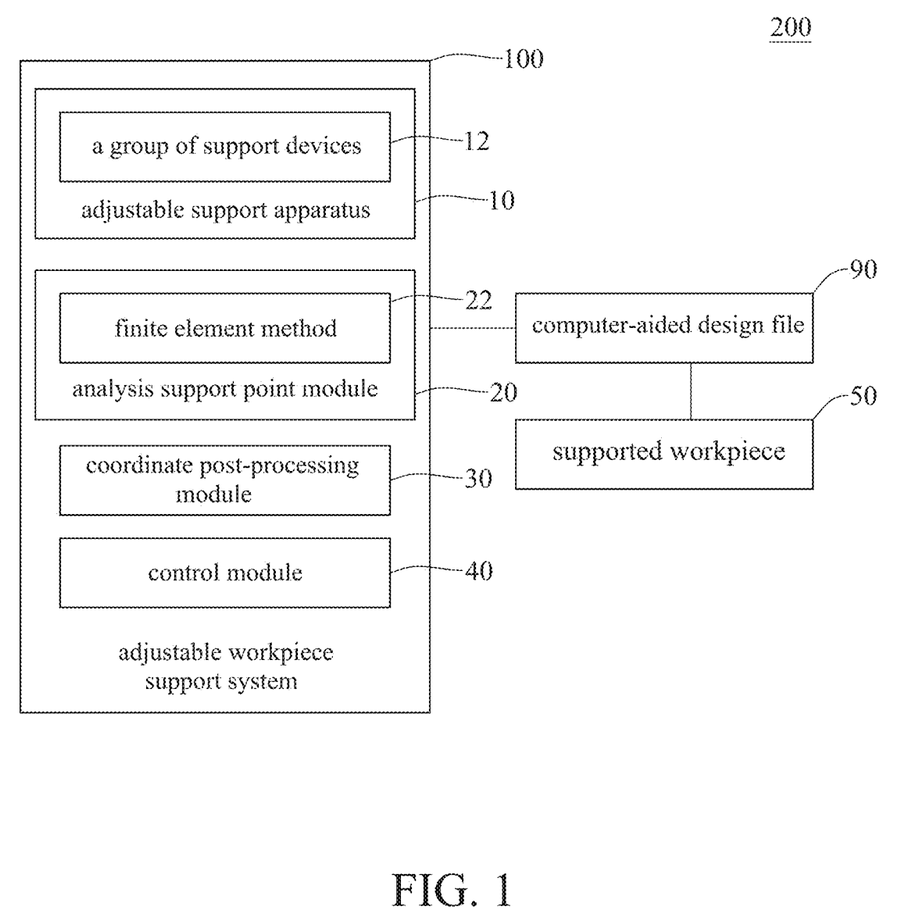
FIG. 1 is a schematic diagram showing the architecture of the adjustable workpiece support system of the disclosure.

FIG. 1 is a schematic diagram showing the architecture of the adjustable workpiece support system of the disclosure. As shown in FIG. 1, a platform 200 of the disclosure has an adjustable workpiece support system 100 and a computer-aided design file 90 of the supported workpiece 50. The adjustable workpiece support system 100 includes an adjustable support apparatus 10, an analysis support point module 20, a coordinate post-processing module 30 and a control module 40.

Figure 2:
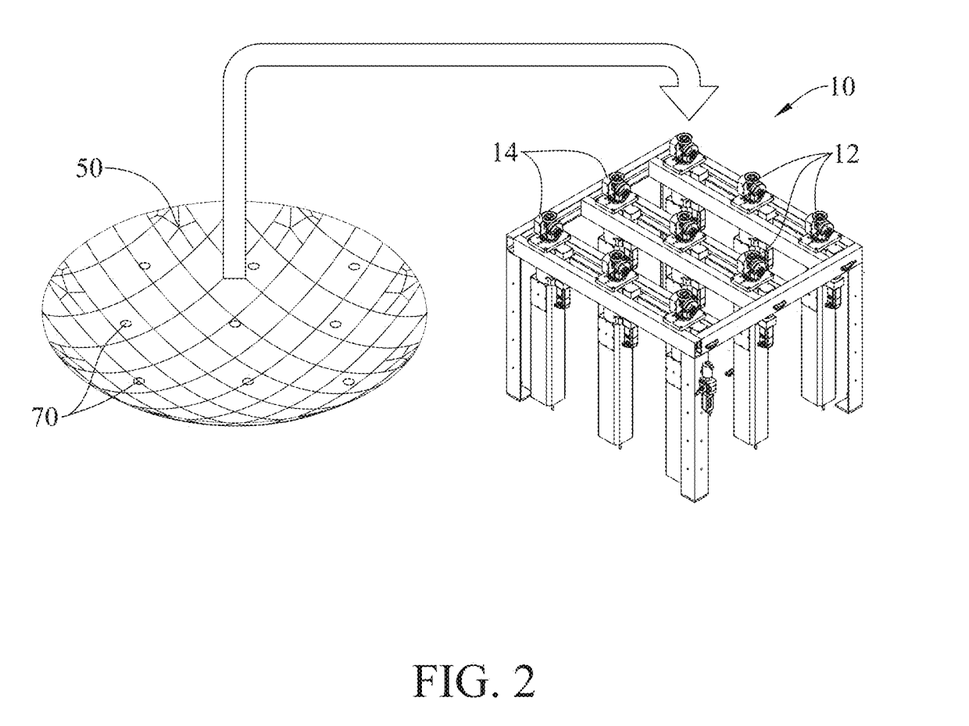
FIG. 2 is a schematic diagram showing the mechanism of an adjustable support apparatus of the disclosure.

FIG. 2 is a schematic diagram showing the mechanism of the adjustable support apparatus of the disclosure. As shown in FIG. 2, the adjustable support apparatus 10 has a group of support devices 12 for supporting a supported workpiece 50. Height and angle of the each support device 12 can be adjusted. A group of 3×3, fixed-pitch support devices 12 are used for supporting the workpiece 50. Essentially, the least amount of the supporting devices 12 of the adjustable support apparatus 10 is 2×2.

The analysis support point module 20 is used to import the computer-aided design file 90 of the supported workpiece 50, and is used to analyze the computer-aided design file 90 to obtain a group of support points 70 of the supported workpiece 50. The coordinate post-processing module 30 is configured to calculate the support coordinates of the each support device 12 corresponding to the group of support points 70. The control module 40 is configured to receive the support coordinates of the each support device 12, and is configured to adjust the height and angle of the each support device 12 to support the supported workpiece 50, so that the amount of deformation of the supported workpiece 50 is the minimum.

The adjustable workpiece support system 100 of the disclosure, in which the supported workpiece 50 is a three-layer composite material with a curved shape as an example to illustrate. After the computer-aided design file 90 of the supported workpiece 50 with a curved shape and thin workpiece is imported into the analysis support point module 20, the material setting of the supported workpiece 50 is performed. The material setting is to set the material of the supported workpiece 50 within three layers in the disclosure. The first layer is a twill woven fabric, the second layer is a glass fiber reinforced plastic, and the third layer is a twill woven fabric. After the material setting is completed, the analysis support point module 20 sets the initial position of the support distribution points of the supported workpiece. Then, a group of support points 70 is set, and the analysis result of the amount of deformation of the workpiece supported by the group of support points 70 is obtained. The analysis support point module 20 uses a finite element method 22 for analysis. The analysis objective of the finite element method 22 is to minimize the amount of deformation generated when the supported workpiece 50 is supported. After analysis, the group of support points 70 is the optimal support points. The finite element method 22 includes ANSYS software.

Figure 3:
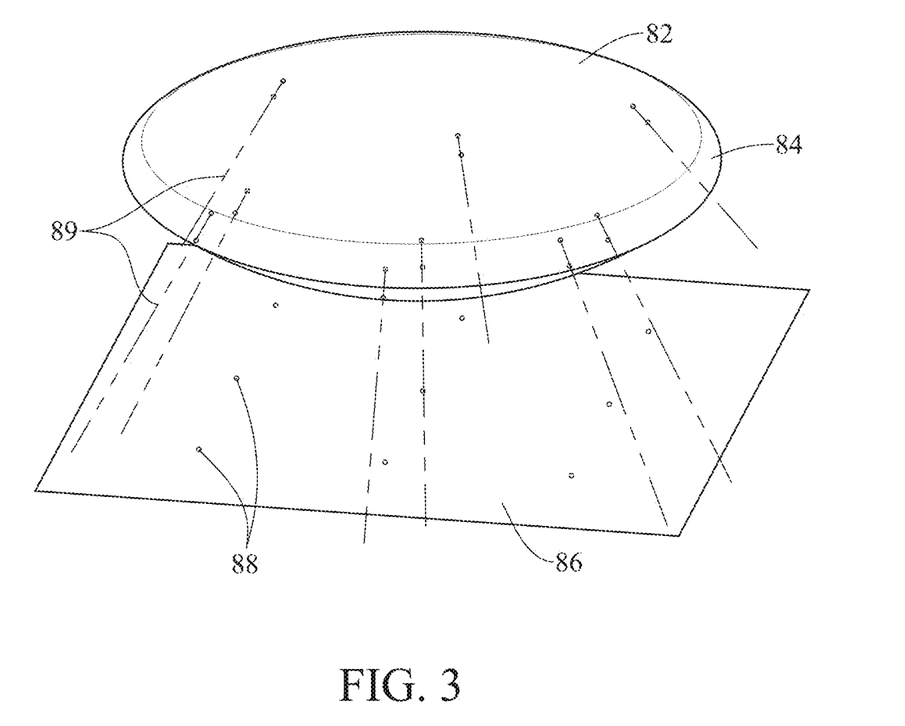
FIG. 3 is the support coordinates of each support device obtained by the coordinate post-processing module of the disclosure.

FIG. 3 is the support coordinates of each support device obtained by the coordinate post-processing module of the disclosure. As shown in FIG. 3, after the disclosure obtains the optimal support point of the workpiece, the coordinate post-processing module 30 calculates the support coordinates of the each support device 12 corresponding to the group of support points 70. The upper curved surface 82 is the computer-aided design file 90 of the supported workpiece 50, and the lower curved surface 84 is a curved surface that is offset outward by a specific distance based on the upper curved surface 82. The above-mentioned specific distance is the distance from the suction cup 14 of the each supporting device 12 to the rotation axis of the A-axis 16 used in the disclosure. The plane 86 is the XY plane 86, and the nine points 88 on the XY plane 86 are the optimal support points. The nine reference axes 89 are normal vectors (i ( ), j ( ), k ( )) of the lower curved surface 84 at the coordinates of the optimal support point. A calculation method of the Z-axis 19 coordinate of the each supporting device 12 used in the disclosure is the perpendicular distance between the XY plane 86 as well as the intersection point of the lower curved surface 84 and the reference axes 89. The coordinate post-processing module 30 calculates the normal vector, such as the reference axes 89 of the workpiece surface based on the support points.

A calculation method of the A-axis 16 coordinate of the each support device 12 is the angle A between the above-mentioned normal vector (i ( ), j ( ), k ( )) and the normal vector of the XY plane 86.

$$A = \cos^{-1}\left|\frac{k}{\sqrt{i^2 + j^2 + k^2}}\right|$$

A calculation method of the C-axis 18 coordinate of the each support device 12 of the disclosure is the angle C between the component (i ( ), j ( ), k ( )) projected on the XY plane 86 and the X-axis.

$$C = \cos\left|\frac{j}{\sqrt{i^2 + j^2}}\right|$$

Figure 4:
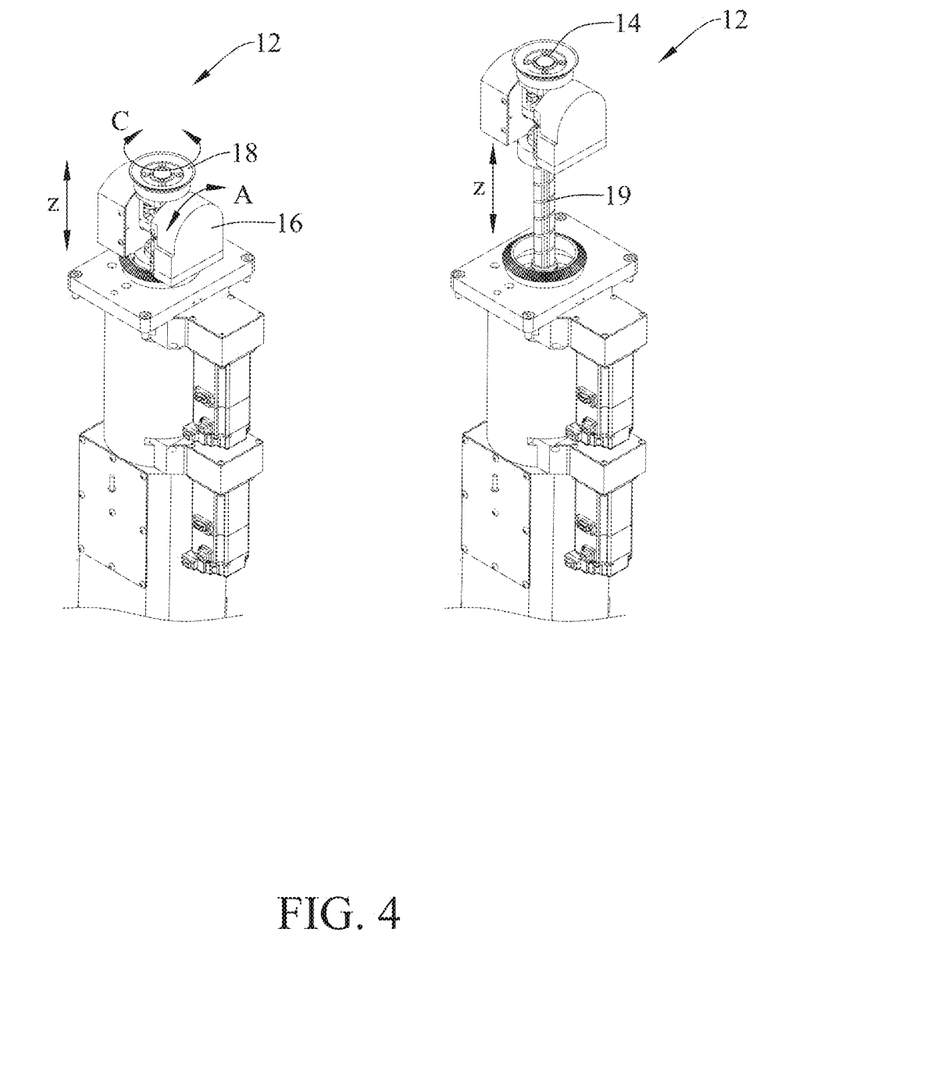
FIG. 4 is a schematic diagram showing the mechanism of a support device of the disclosure.
Figure 5:
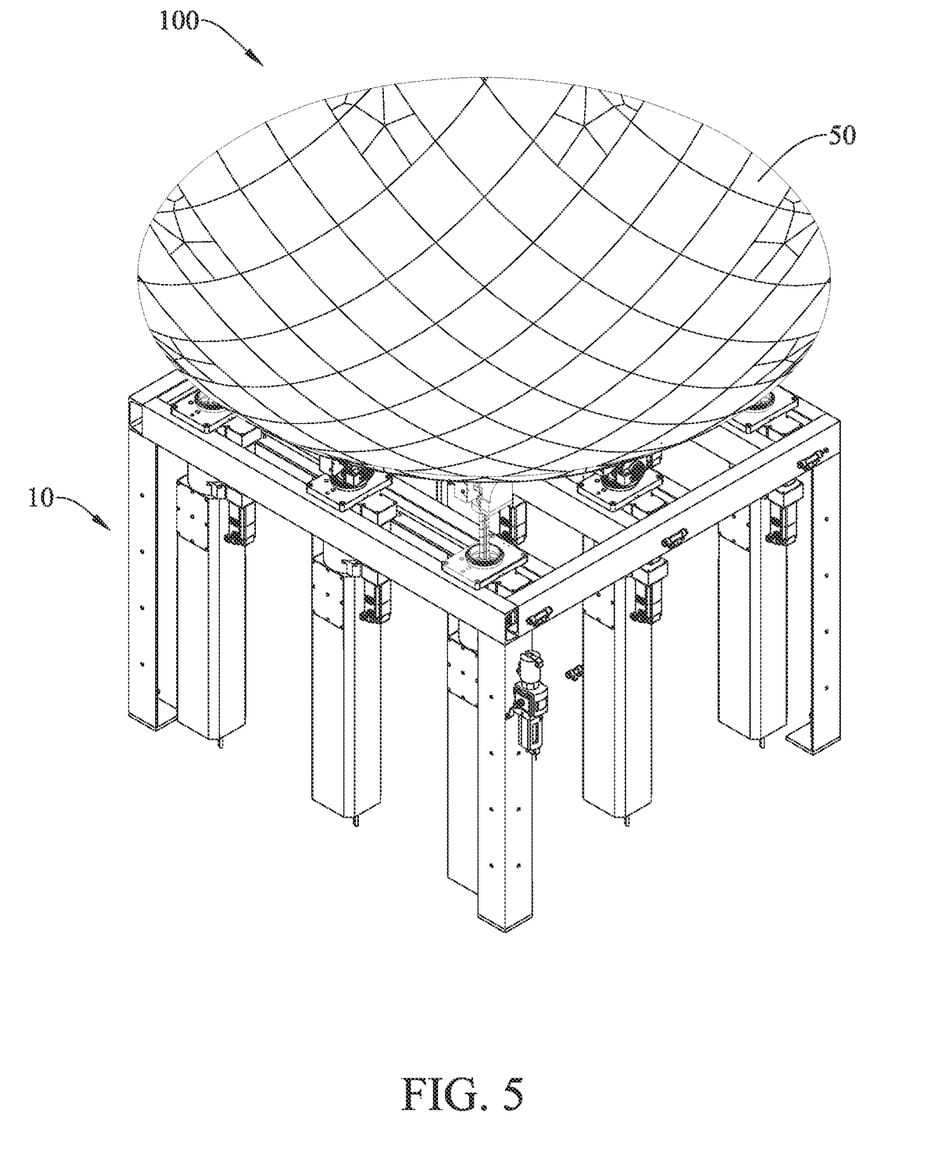
FIG. 5 is a schematic diagram of an adjustable support apparatus of the disclosure actually supporting a thin curved workpiece.

After receiving the support coordinates of the each support device 12, the control module 40 adjusts the height and angle of the each support device 12 to support the supported workpiece so that the amount of deformation of the supported workpiece is the minimum. FIG. 4 is a schematic diagram showing the mechanism of a support device of the disclosure. As shown in FIG. 4, the operation timing of all the support devices 12 of the adjustable support apparatus 10 must first be in the condition that the bevel gear is engaged before the A-axis 16 can be positioned. Next, the Z-axis 19 is positioned. When the Z-axis 19 is raised, the bevel gear is also disengaged. When the Z-axis 19 reaches the commanded height, the C-axis 18 can be positioned. The coordinate post-processing module 30 needs to distinguish the operation timing of the each support device 12 in order to convert the corresponding instruction. The coordinate post-processing module 30 calculates the support coordinates from the group of support points 70 generated by the analysis support point module 20. In addition, a command can be issued to the adjustable support apparatus 10 to make the supporting devices 12 work, based on the operation timing of all the supporting devices 12. FIG. 5 is a schematic diagram of an adjustable support apparatus of the disclosure actually supporting a thin curved workpiece. It can be seen from the schematic diagram that the adjustable workpiece support system 100 of the disclose is capable of supporting the thin curved workpiece, has the function of fast operation speed, and is suitable for a small number of large and diverse workpieces, and has high positioning accuracy. Large workpieces can be machined by cutting, drilling, or cutting after being positioned using the adjustable support apparatus 10.

Figure 6:
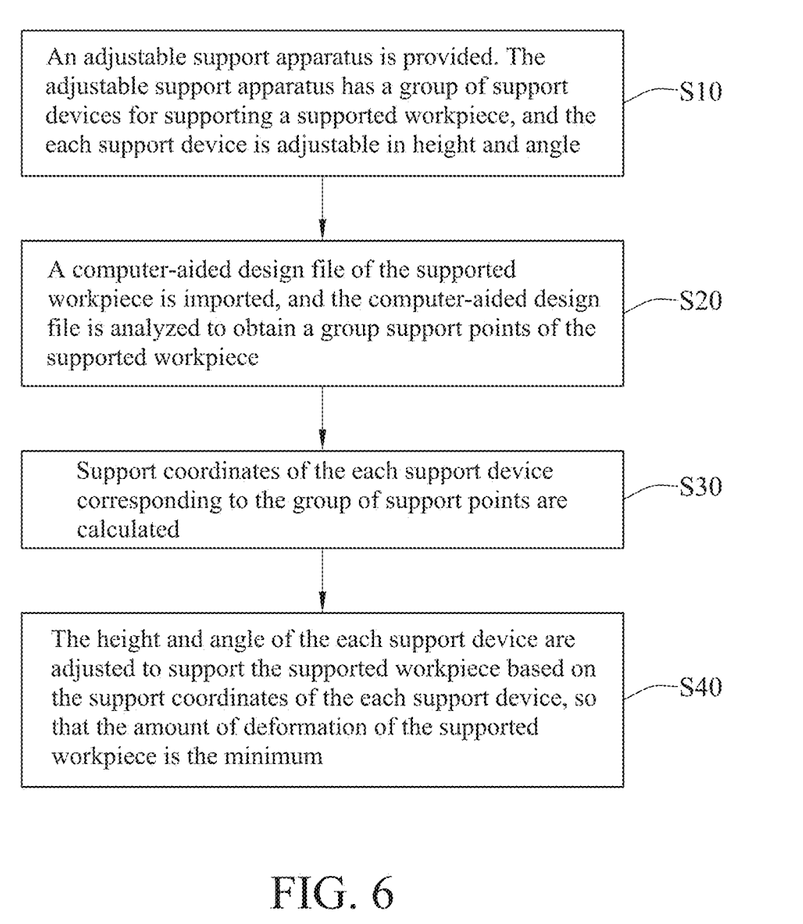
FIG. 6 is a flowchart of an adjustable workpiece support method of the disclosure.

FIG. 6 is a flowchart of an adjustable workpiece support method of the disclosure. The adjustable workpiece support method of the disclosure is implemented by the adjustable workpiece support system 100. First, an adjustable support apparatus is provided. The adjustable support apparatus has a group of support devices for supporting a supported workpiece, and the each support device is adjustable in height and angle, as shown in step S10. Second, a computer-aided design file of the supported workpiece is imported, and the computer-aided design file is analyzed to obtain a group support points of the supported workpiece, as shown in step S20. Next, support coordinates of the each support device corresponding to the group of support points are calculated, as shown in step S30. Finally, the height and angle of the each support device are adjusted to support the supported workpiece based on the support coordinates of the each support device, so that the amount of deformation of the supported workpiece is the minimum, as shown in step S40.

1. The adjustable workpiece support system of the disclosure has actuating element in the respective support devices, and can simultaneously position all the support devices.

2. The adjustable workpiece support system of the disclosure has a rotation axis, can smoothly adhere to curved workpiece surfaces, and has a position feedback function, which can accurately position.

3. The adjustable workpiece support system of the disclosure first calculates the amount of deformation of all support points when the workpiece is supported, so that the amount of deformation of the supported workpiece is the minimum.

What is claimed is:

1. An adjustable workpiece support system for a thin supported workpiece with a curved surface made from composite materials, the adjustable workpiece support system comprising:
   an adjustable support apparatus, having a group of support devices for supporting the supported workpiece, each support device being adjustable in height and angle;
   an analysis support point module, used to import a computer-aided design file of the supported workpiece, analyze the computer-aided design file set a material of the supported workpiece, and set an initial point of support points of the supported workpiece to obtain a group of support points of the supported workpiece;
   a coordinate post-processing module, configured to calculate the support coordinates of each support device corresponding to the group of support points; and
   a control module, configured to receive the support coordinates of each support device, and configured to adjust the height and angle of each support device to support the supported workpiece and minimize deformation of the supported workpiece;
   wherein the analysis support point module uses a finite element method for analysis to minimize the amount of deformation generated when the supported workpiece is supported; and
   wherein each support device is height adjustable in parallel and extends from a common plane to support the curved surface of the supported workpiece.

2. The adjustable workpiece support system as recited in claim 1, wherein the quantity of the group of support devices is 2×2.

3. An adjustable workpiece support method for a thin supported workpiece with a curved surface made from composite materials, the method comprising the steps of:
   providing an adjustable support apparatus having a group of support devices for supporting the supported workpiece, each support device being adjustable in height and angle, wherein each support device is height adjustable in parallel and extends from a common plane to support the curved surface of the supported workpiece;
   importing a computer-aided design file of the supported workpiece, and analyzing the computer-aided design file;
   setting a material of the supported workpiece and setting an initial point of support points of the supported workpiece to obtain a group of support points of the supported workpiece;
   using a finite element method for analysis to minimize the amount of deformation generated when the supported workpiece is supported;
   calculating support coordinates of each support device corresponding to the group of support points; and
   adjusting the height and angle of each support device to support the supported workpiece based on the support coordinates of each support device and minimize deformation of the supported workpiece.

4. The adjustable workpiece support method as recited in claim 3, wherein the quantity of the group of support devices is 2×2.

* * * * *